(12) United States Patent
Brown et al.

(10) Patent No.: US 12,454,807 B1
(45) Date of Patent: *Oct. 28, 2025

(54) SKID STEER TRIMMER ASSEMBLY

(71) Applicant: Burchland Mfg. Inc., Gilman, IA (US)

(72) Inventors: Trevor Brown, Eldon, IA (US); Aaron Burchland, Gilman, IA (US)

(73) Assignee: Burchland Mfg. Inc., Gilman, IA (US)

( * ) Notice: Subject to any disclaimer, the term of this patent is extended or adjusted under 35 U.S.C. 154(b) by 1226 days.

This patent is subject to a terminal disclaimer.

(21) Appl. No.: 17/181,132

(22) Filed: Feb. 22, 2021

Related U.S. Application Data

(63) Continuation of application No. 16/281,243, filed on Feb. 21, 2019, now Pat. No. 10,961,684.

(60) Provisional application No. 62/633,336, filed on Feb. 21, 2018.

(51) Int. Cl.
*E02F 3/78* (2006.01)

(52) U.S. Cl.
CPC .................................. *E02F 3/783* (2013.01)

(58) Field of Classification Search
CPC ... E02F 3/34; E02F 3/783; E02F 3/962; E02F 3/3414; E02F 3/7613; E02F 3/761; E02F 3/7618

See application file for complete search history.

(56) References Cited

U.S. PATENT DOCUMENTS

| | | | | |
|---|---|---|---|---|
| 3,841,410 A | * | 10/1974 | Nikitin | E02F 3/783 37/189 |
| 4,878,713 A | * | 11/1989 | Zanetis | E02F 5/00 404/90 |
| 5,391,017 A | * | 2/1995 | Thomas | E01C 23/088 404/93 |
| 6,035,478 A | * | 3/2000 | Miller | A46B 13/02 56/15.8 |
| 7,789,587 B2 | * | 9/2010 | James | E02F 3/967 404/96 |
| 8,573,885 B2 | * | 11/2013 | Latham | E01C 23/088 404/94 |
| 9,032,648 B2 | * | 5/2015 | Zuk | A01B 13/00 37/94 |
| 9,402,338 B2 | * | 8/2016 | Jensen | A01B 27/005 |
| 10,533,301 B1 | * | 1/2020 | Armas | E02F 3/7618 |
| 2006/0070754 A1 | * | 4/2006 | Zanetis | A01B 59/064 172/47 |

* cited by examiner

*Primary Examiner* — Joseph M Rocca

(74) *Attorney, Agent, or Firm* — David M. Breiner; BrownWinick Law Firm

(57) ABSTRACT

A skid steer trimmer assembly usable for contouring the ground including a first housing supporting an auger, a first actuator configured to adjust a first end of the auger and a second actuator configured to adjust a second end of the auger. A stabilizer supporter by a second housing is arranged behind the auger.

19 Claims, 11 Drawing Sheets

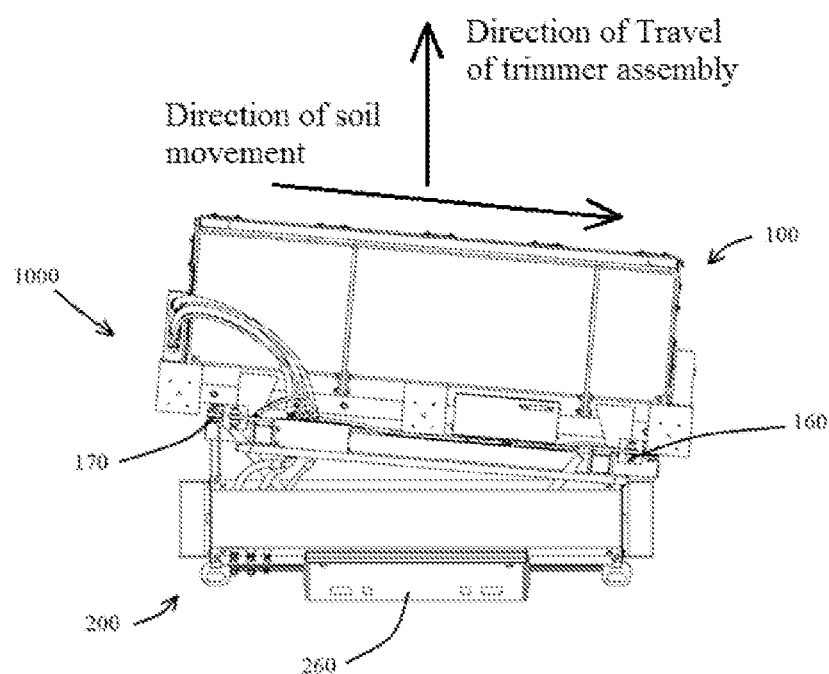

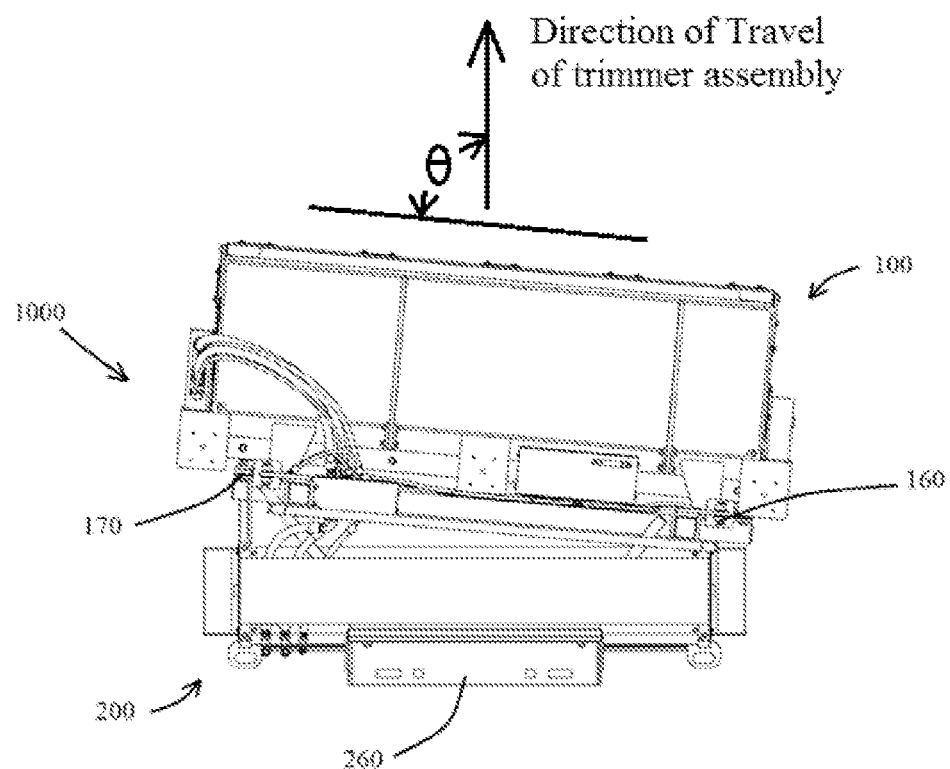

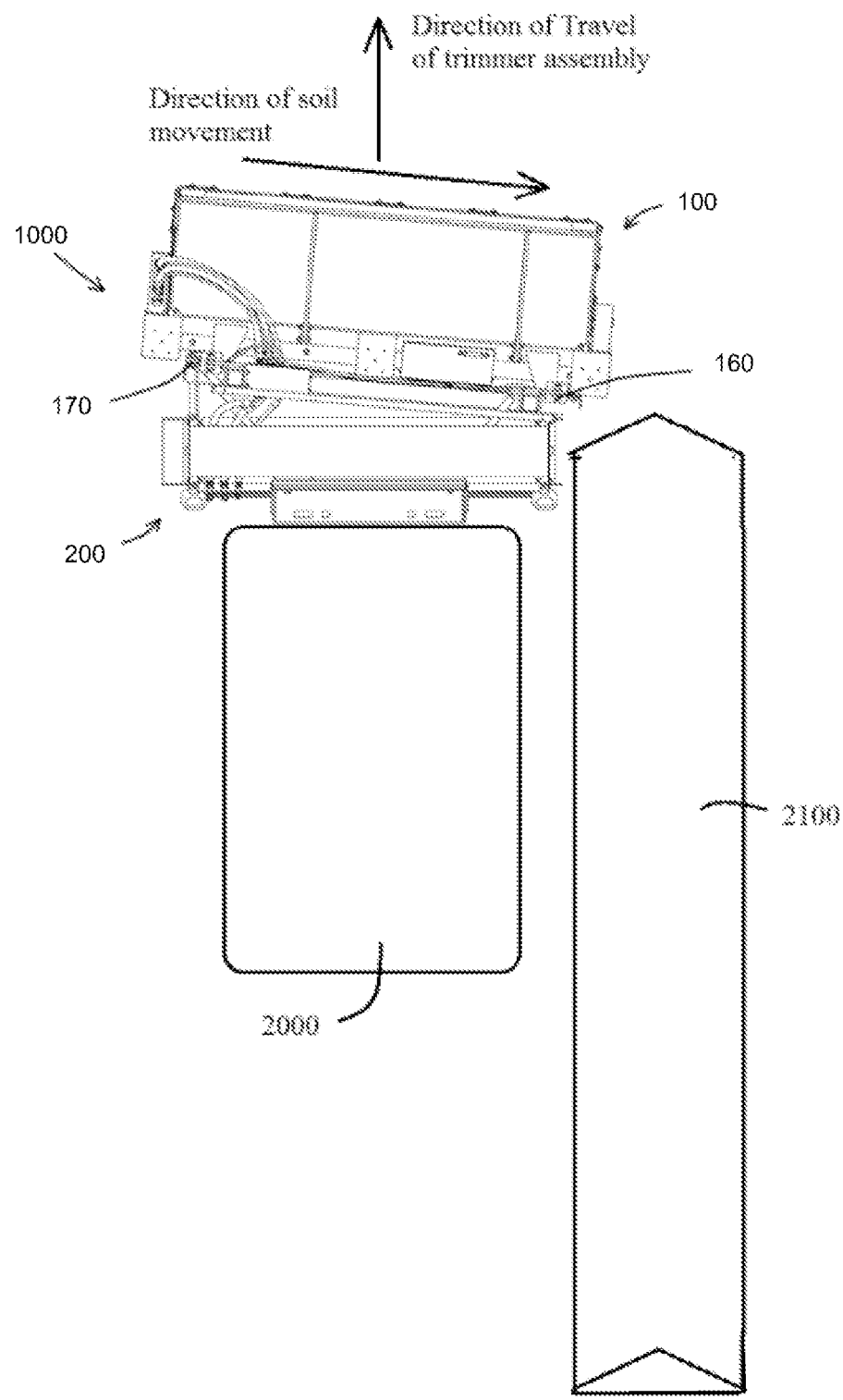

SKID STEER TRIMMER ASSEMBLY

CROSS REFERENCE TO RELATED APPLICATIONS

This application is a continuation of U.S. patent application Ser. No. 16/281,243 which was filed on Feb. 21, 2019, which claims the benefit of U.S. Provisional Application No. 62/633,336 which was filed on Feb. 21, 2018, the entirety of each of which is incorporated herein fully by reference.

BACKGROUND

1. Field

Example embodiments relate to a skid steer trimmer assembly usable for contouring the ground.

2. Description of the Related Art

Skid steers are small, rigid-framed, engine-powered machines usable for several purposes. One such purpose is the contouring of ground. For this purpose trimmers are mounted on the front of the skid steers and the skid steers move the trimmers to contour the ground. Having the correct contour can be important for several reasons. For example, parking lots are generally designed with one or more slopes to encourage water to run off the parking lot in a controlled manner. If the ground is not contoured properly water may not properly drain from the parking lot.

SUMMARY

The inventors have noted several problems with conventional trimmers mounted on skid steers. First, the trimmers and skid steers have a tendency to bounce thereby diminishing their ability to achieve the proper sub-grade elevation. This bounce or wave or elevation change is not acceptable for paving applications. Second, the finished surface, at times, is not as compact as is desired. As a consequence, the inventors set out to solve these problems. The result is a modified trimmer which virtually eliminates the aforementioned problems.

BRIEF DESCRIPTION OF THE DRAWINGS

Example embodiments are described in detail below with reference to the attached drawing figures, wherein:

FIG. 8 represents a top view of a skid steer trimmer assembly showing a direction of travel of the skid steer trimmer assembly and a direction of soil movement through a trimmer assembly in accordance with example embodiments;

FIG. 9 represents a top view of a skid steer trimmer assembly showing a trimmer assembly inclined from a direction of travel of the skid steer trimmer assembly with respect to the direction of travel of the skid steer trimmer assembly in accordance with example embodiments; and FIGS. 10-13 illustrate operation of the skid steer trimmer assembly in accordance with example embodiments is a view of a compartment associated with a structure in accordance with example embodiments.

DETAILED DESCRIPTION

Figure 1:
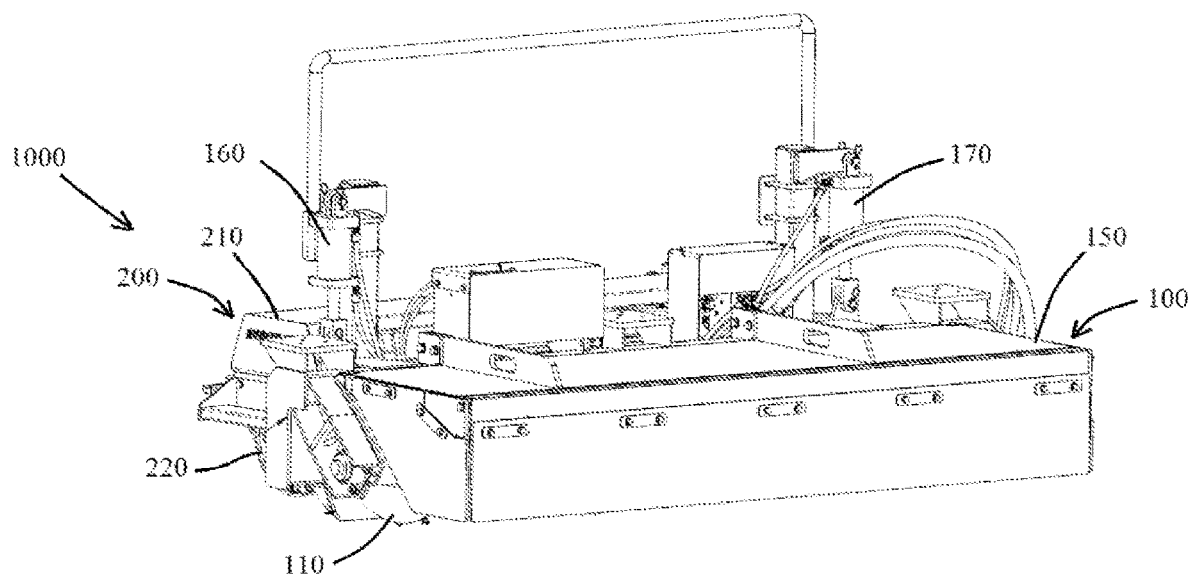
FIG. 1 is a first perspective view of a skid steer trimmer assembly in accordance with example embodiments.

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a skid steer trimmer assembly usable for contouring the ground.

Figure 2:
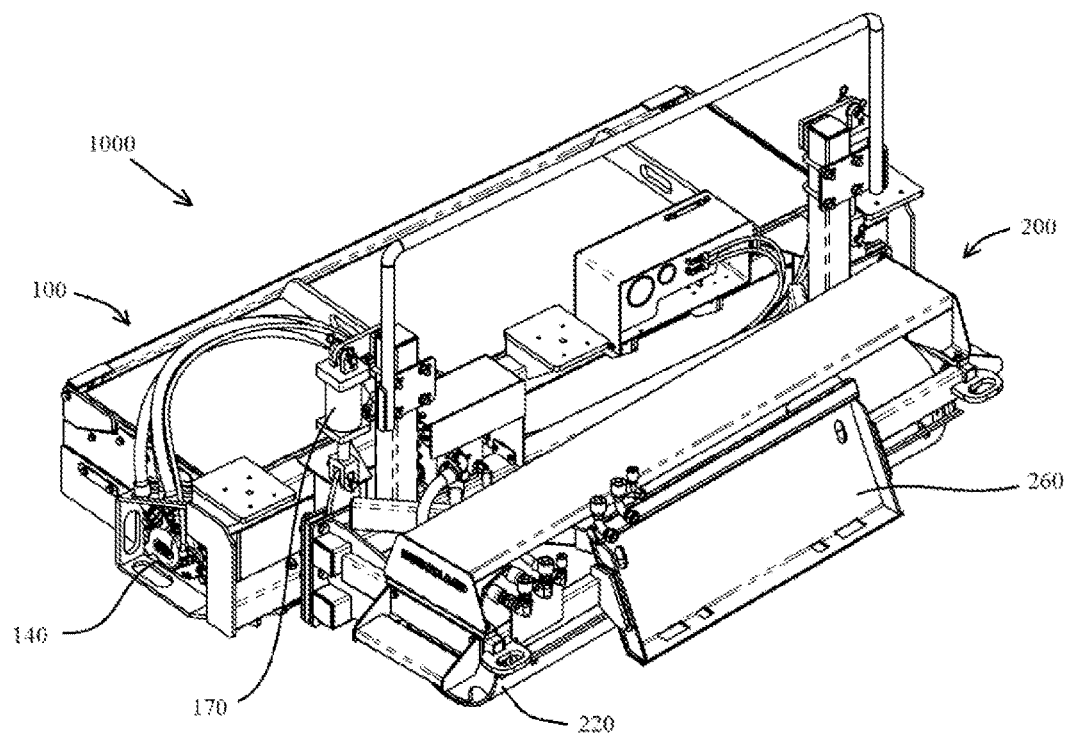
FIG. 2 a second perspective view of a skid steer trimmer assembly in accordance with example embodiments.
Figure 3:
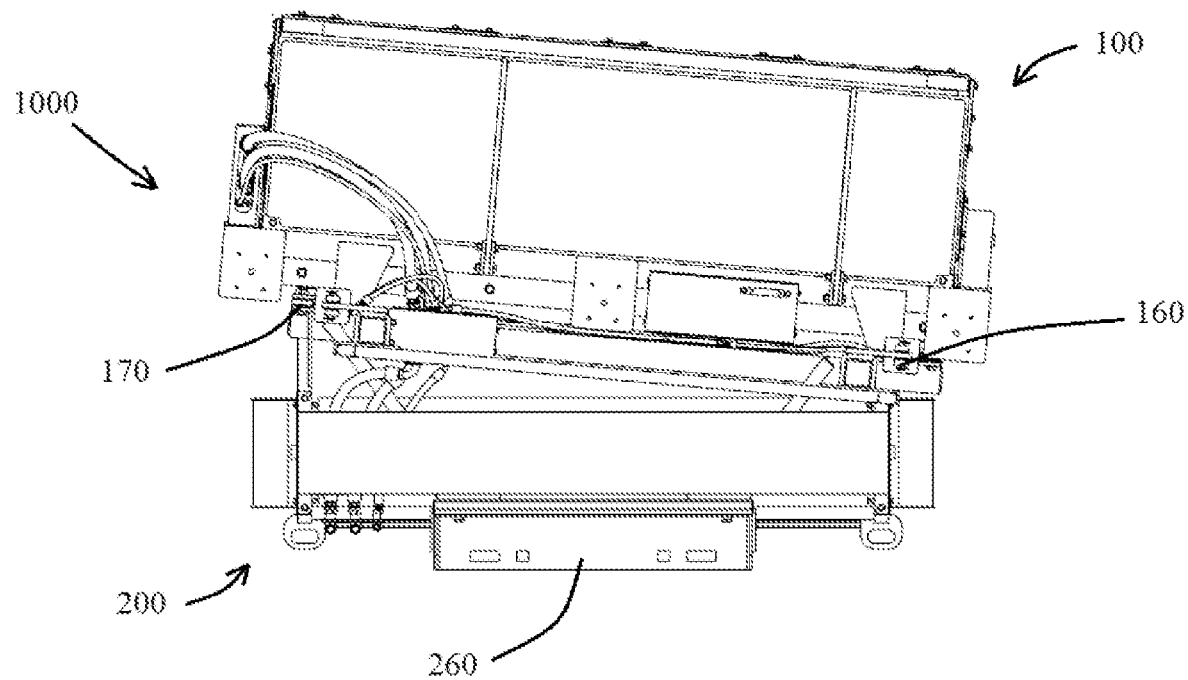
FIG. 3 a top view of a skid steer trimmer assembly in accordance with example embodiments.
Figure 4:
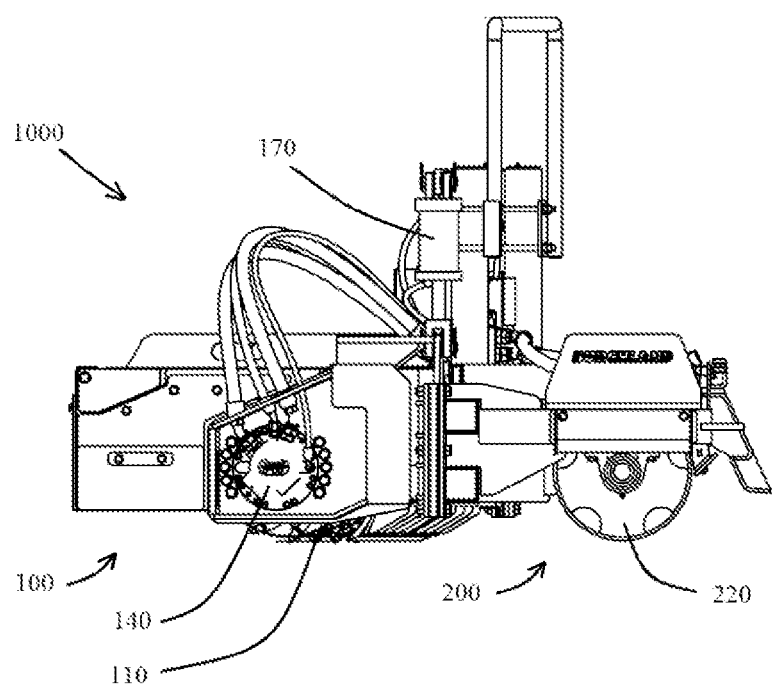
FIG. 4 is a side view of a skid steer trimmer assembly in accordance with example embodiments.
Figure 5:
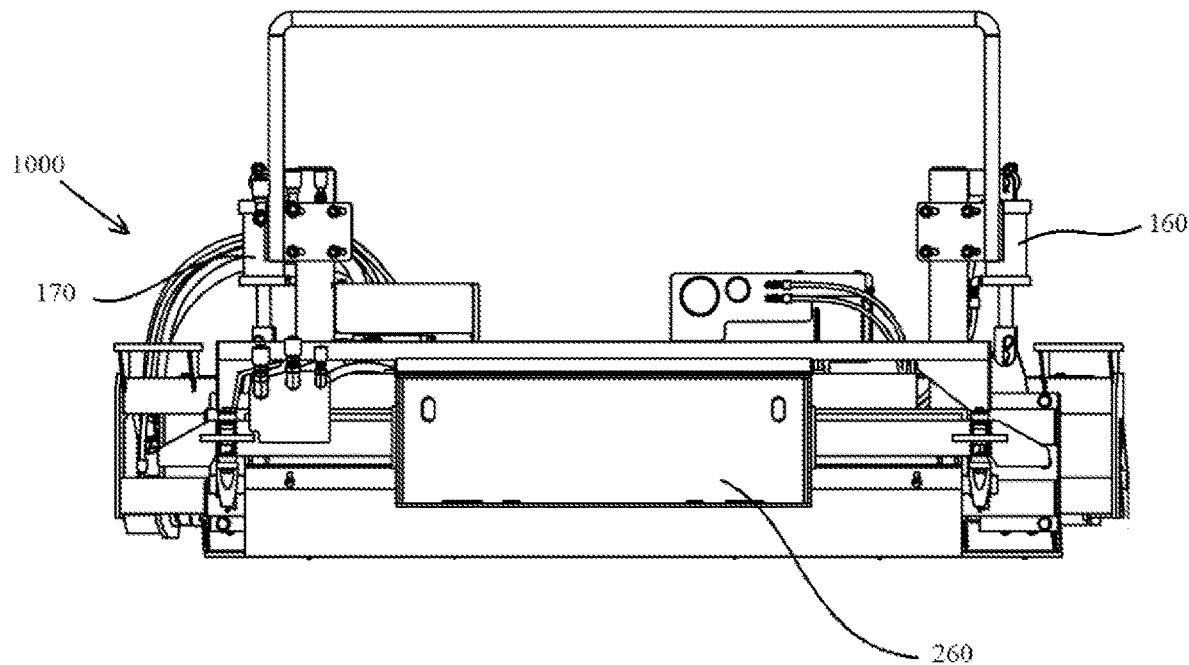
FIG. 5 a back view of a skid steer trimmer assembly in accordance with example embodiments.
Figure 6A:
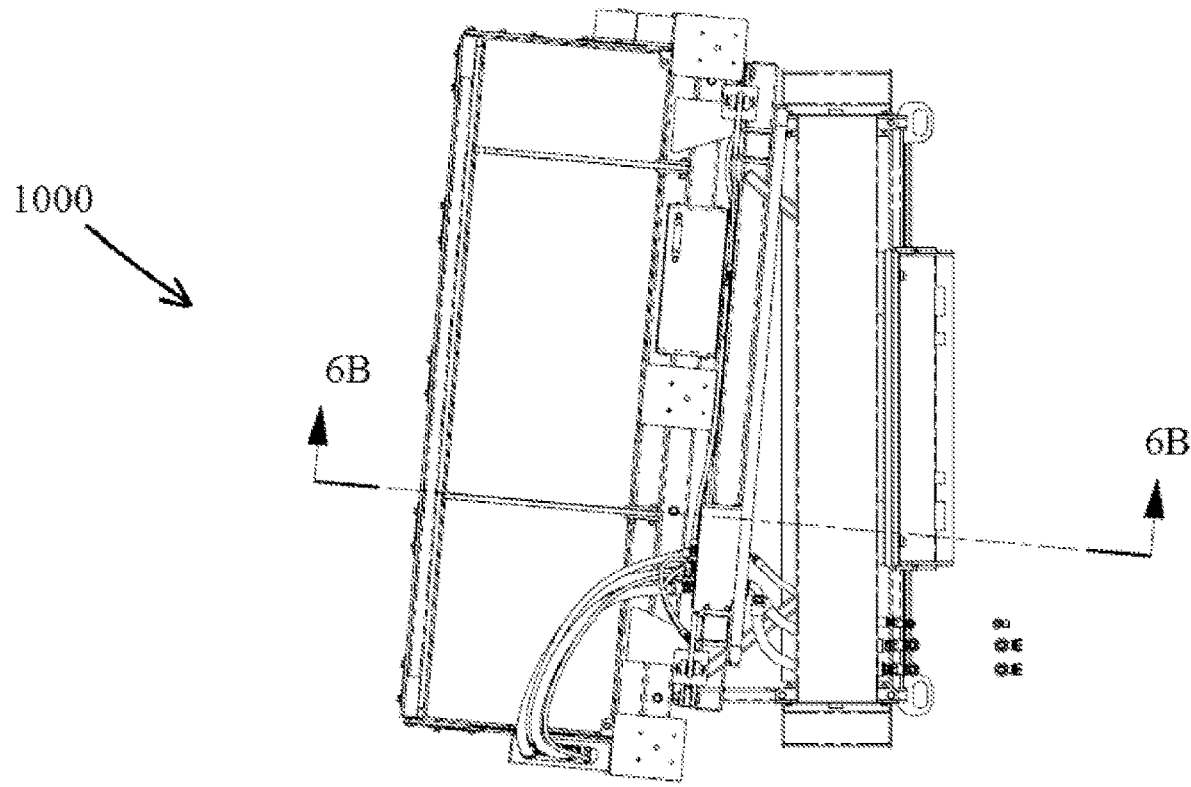
FIGS. 6A-6B represent a top view and a first section view of a skid steer trimmer assembly in accordance with example embodiments.
Figure 6B:
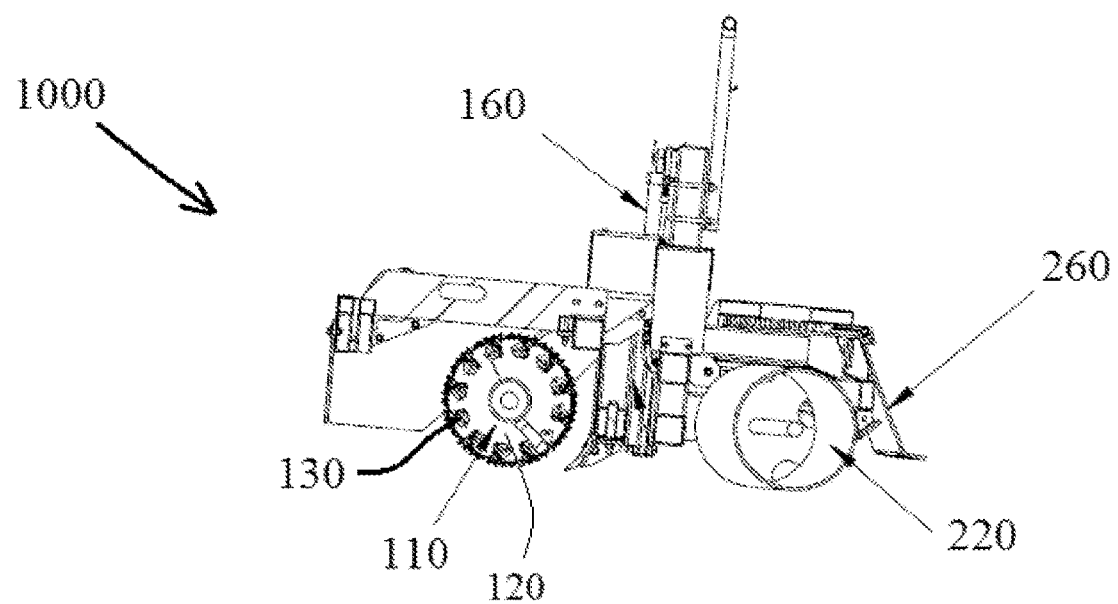
Figure 7A:
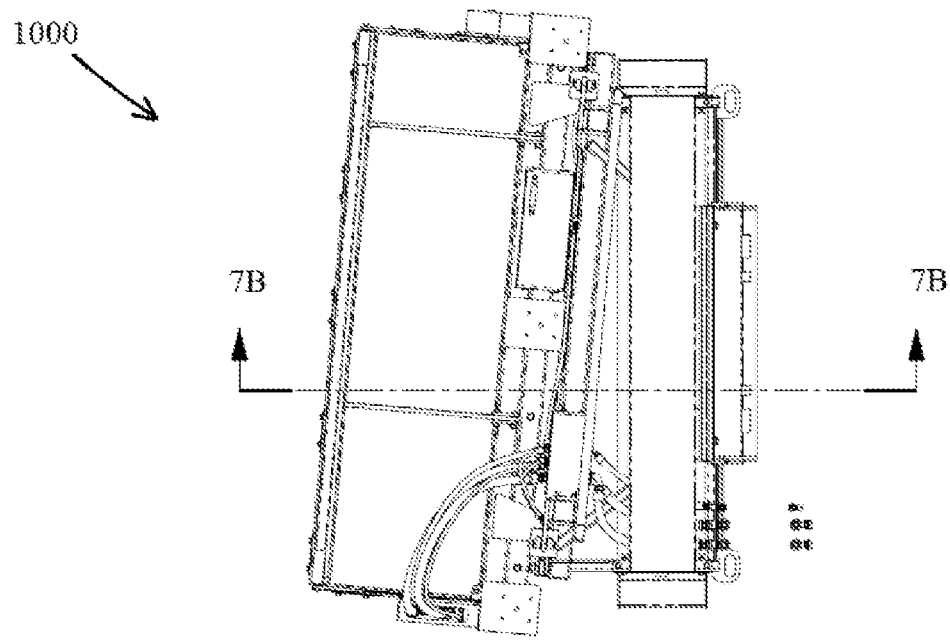
FIGS. 7A-7B represent a top view and a second section view of a skid steer trimmer assembly in accordance with example embodiments.
Figure 7B:
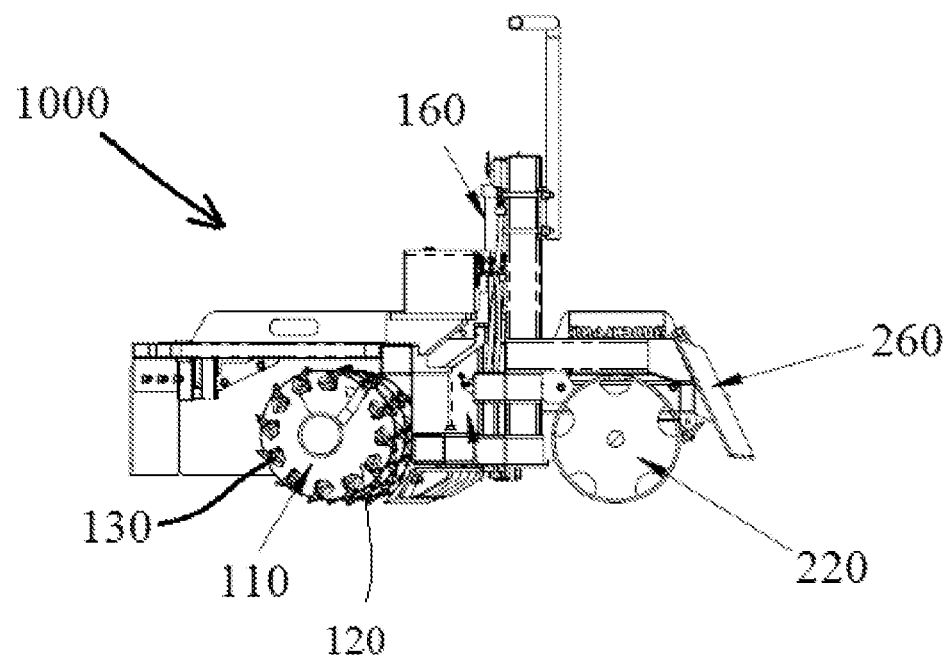

FIG. 1 is a first perspective view of a skid steer trimmer assembly 1000 usable for mounting on a skid steer and usable to control the contour of the ground. FIG. 2 is a second perspective view the skid steer trimmer assembly 1000. FIG. 3 is a top view of the skid steer trimmer assembly 1000. FIG. 4 is a side view of the skid steer trimmer assembly 1000. FIG. 5 is a back view of the skid steer trimmer assembly 1000. FIGS. 6A and 6B illustrate a first section view of the skid steer trimmer assembly 1000. FIGS. 7A and 7B illustrate a second section view of the skid steer trimmer assembly 1000. Referring to FIGS. 1-7B, the skid steer trimmer assembly 1000 according to a nonlimiting example embodiment is comprised of a trimmer assembly 100 followed by a stabilizer 200 assembly.

In example embodiments, the trimmer assembly 100 may include a first frame 150 which supports an auger 110. The auger 110, for example, may have flightings 120 which may have diameters of about 16 inches and which may have replaceable carbide cutting teeth 130. The auger 110 may run about the length of the trimmer assembly 100 and may be actuated by a hydraulic motor 140, for example, a 38.26 cubic inch displacement, direct drive hydraulic motor, which may be attached to the first frame 150. In example embodiments activation of the hydraulic motor 140 causes the auger 110 to turn which, when in contact with soil, causes the soil to move along the auger 110. In this way the ground can be contoured.

In example embodiments, the first frame 150 may be movably supported by a second frame 210 which may be part of the stabilizer assembly 200. In example embodiments, the first frame 150 may be configured to move vertically with respect to the second frame 210 of the stabilizer assembly 200 by virtue of a pair of actuators 160 and 170 which may be arranged between the first frame 150 and the second frame 210. For example, rods of the first and second actuators 160 and 170 may be attached to the second frame 210 whereas barrels of the first and second actuators 160 and 170 may be attached to the first frame 150. In operation, the first frame 150 may be moved upwards or downwards via operation of the pair of actuators 160 and 170. In addition, the pair of actuators 160 and 170 may be operated independently and thus may position the first frame 150 in a manner that inclines it from the horizontal. For example, the first actuator 160 may move a first end of the frame 150 to first elevation above the ground, for example, about 10 inches from the ground, and the second actuator 170 may move a second end of the frame 150 to a second elevation above the ground, for example, about 11 inches from the ground. In this manner, the trimmer assembly 100 may be operated to provide a ground contouring of various inclinations.

The trimmer assembly 100 is configured to move soil in direction which is generally perpendicular (or nearly perpendicular) to the direction of travel of the trimmer assembly 100 (see FIG. 8). For example, in one embodiment, the trimmer assembly 100 may be arranged so that it makes an angle θ other than 90 degrees with the direction of travel of the trimmer assembly 100. For example, the trimmer assembly 100 may be arranged so that it forms an angle θ of about 85 degrees, or about 80 degrees, or about 75 degrees to the angle of travel (see FIG. 9). Angling the trimmer assembly 100 facilitates a windrowing of material as the trimmer assembly 100 operates and is moved across the ground.

In example embodiments the second frame 210 may be supported by a stabilizer 220. The stabilizer 220 may be, for example, a roller, for example, a drum style roller. The stabilizer 220 is arranged to ride on the grade behind the trimmer assembly 100. The stabilizer 220 allows an operator of the skid steer to put some weight on the stabilizer 220 which helps stabilize the skid steer trimmer assembly 1000 during operation. In some embodiments, the stabilizer 220 may also help pack the soil and leave a relatively smooth finish. In example embodiments the stabilizer 220 is not required to be a drum style roller, for example, in other nonlimiting example embodiments the stabilizer 220 may be comprised of one or more wheels and/or skids. For purpose of clarity, the main function of the stabilizer 220 is to support the weight of the trimmer and/or skid steer while producing the finish grade. This eliminates bounce, wave and/or unwanted variations in the finish grade resulting in a significant improvement in a paving finish.

Figure 10:
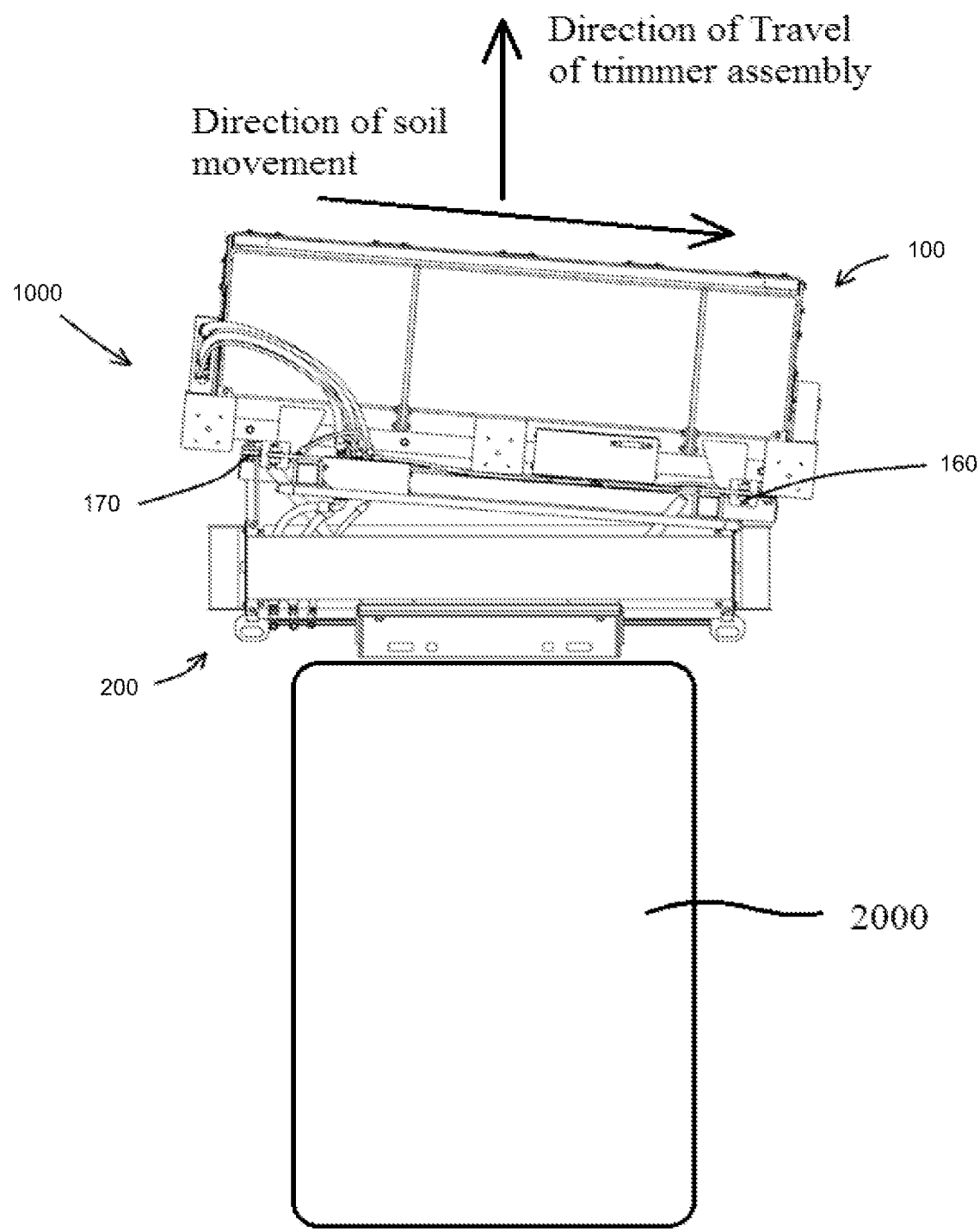
Figure 11:
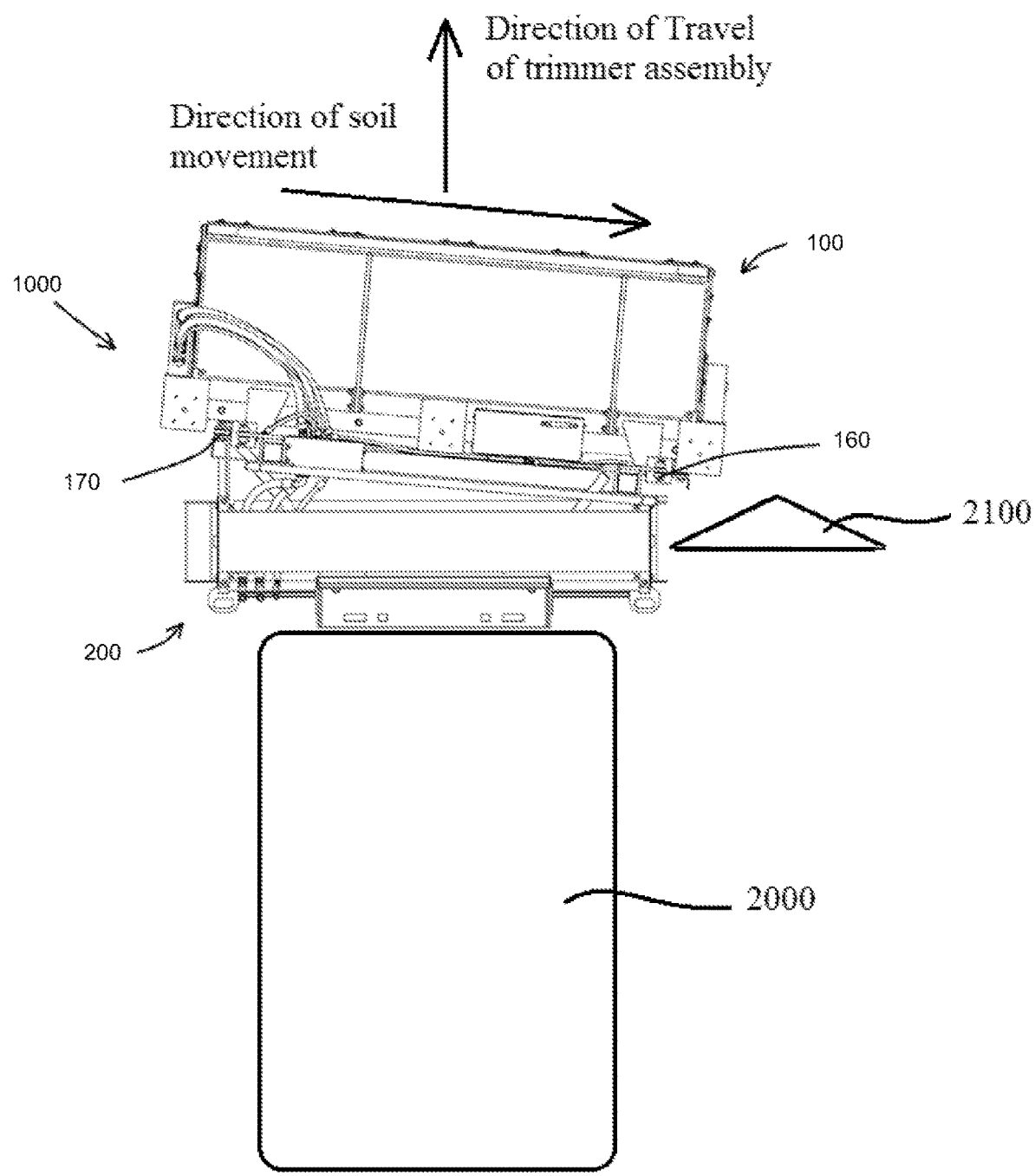
Figure 12:
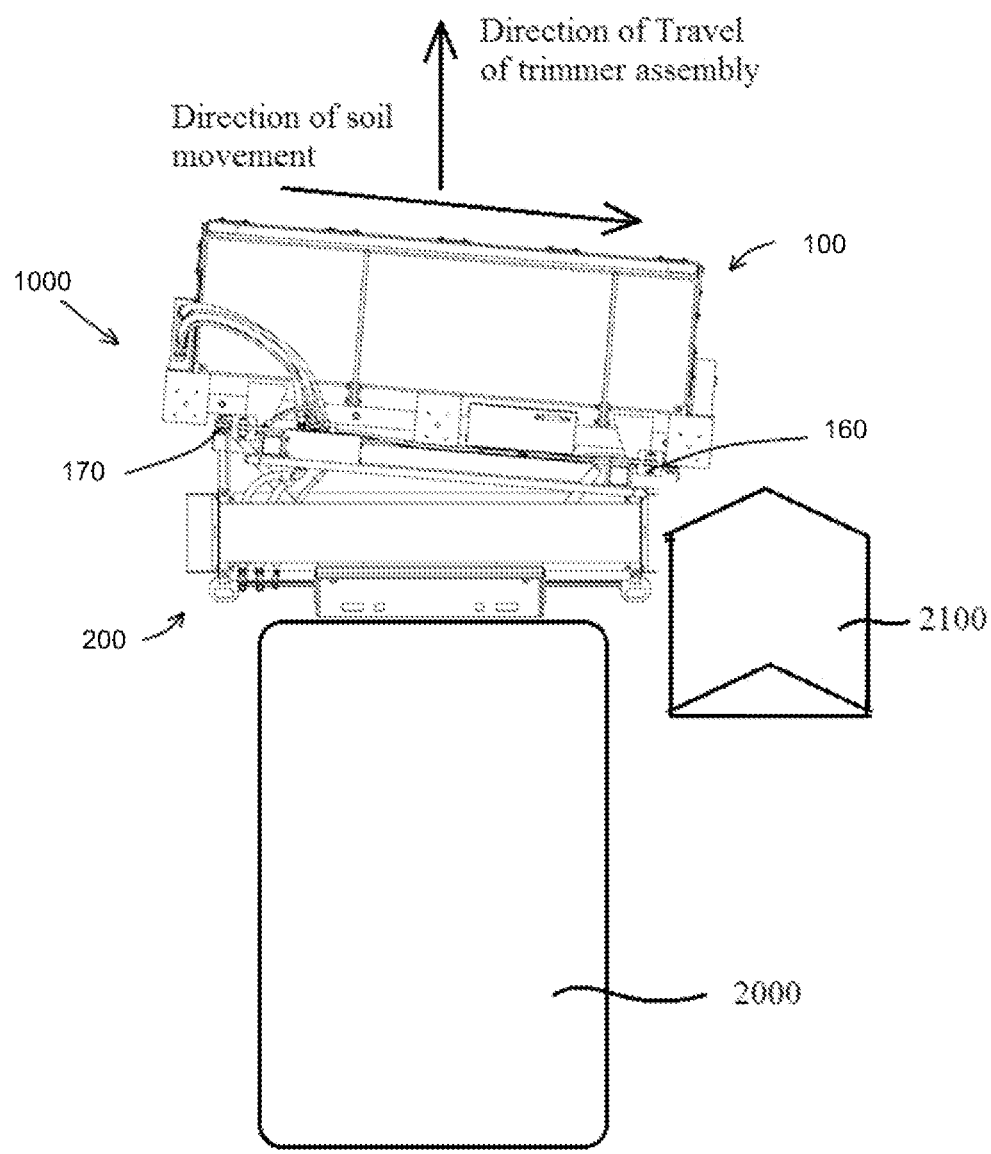

In example embodiments the second frame 210 may include a coupler 260 to attach the second frame 210 to a skid steer 2000. The skid steer 2000 may push the skid steer trimmer assembly 1000 in a direction of travel to contour the ground. In one nonlimiting example embodiment the trimmer assembly 100 may be pushed in a direction of travel and the trimmer assembly 100 may be inclined from the direction of travel as shown in FIG. 10. As the trimmer assembly 100 is pushed across the ground the auger 110 of the trimmer assembly 100 moves soil to a side of the trimmer assembly 100 to create a windrow 2100 as shown in FIG. 11. FIG. 12 illustrates the trimmer assembly 100 being pushed by the skid steer 2000 to further create the windrow 2100. FIG. 13 shows the trimmer assembly 100 being pushed even further along the direction of travel which results in a longer windrow 2100.

In example embodiments the performance of the skid steer assembly 1000 can be enhanced using an electronic controller to control a hydraulic circuit that controls the actuators 160 and 170 (thereby controlling orientation of the auger 110 and its elevation). The controller, for example, may be a computer which is configured to control the hydraulic circuit. For example, a civil engineer may design a three dimensional surface in a CAD system and upload the surface to the computer. The controller may use this surface to control the hydraulic circuit to ensure the auger 110 is orientated properly and at the desired elevation to create the desired three dimensional surface. The system may be further improved by incorporating a GPS locator in the skid steer trimmer assembly 1000 and/or the skid steer 2000. This would enable the controller to precisely know it's location to control the circuit in accordance with the three dimensional surface stored in the controller's memory.

Example embodiments of the invention have been described in an illustrative manner. It is to be understood that the terminology that has been used is intended to be in the nature of words of description rather than of limitation.

Many modifications and variations of example embodiments are possible in light of the above teachings. Therefore, within the scope of the appended claims, the present invention may be practiced otherwise than as specifically described.

What we claim is:

1. A skid steer trimmer assembly comprising:
an auger having flightings configured to move soil generally perpendicular to a direction of travel of the skid steer trimmer assembly;
a motor configured to actuate the auger;
a stabilizer arranged behind the auger;
an actuator configured to move the auger with respect to the stabilizer; and
a coupler arranged behind the stabilizer, the coupler configured to couple the skid steer trimmer assembly to a skid steer, wherein the stabilizer is configured to support at least some of the weight of the skid steer trimmer assembly to stabilize the skid steer trimmer assembly.

2. The skid steer trimmer assembly of claim 1, wherein the auger forms an angle of about 75 to about 85 degrees with a direction of travel of the skid steer trimmer assembly.

3. The skid steer trimmer assembly of claim 1, further comprising:
a hydraulic circuit configured to control hydraulic fluid flowing to the motor and the actuator.

4. The skid steer trimmer assembly of claim 3, further comprising:
an electronic controller configured to control the hydraulic circuit.

5. The skid steer trimmer assembly of claim 4, wherein the electronic controller controls the actuator in accordance with an electronic surface stored in a memory of the electronic controller.

6. The skid steer trimmer assembly of claim 1, wherein the stabilizer is one of a roller, a wheel, and a skid.

7. The skid steer trimmer assembly of claim 1, further comprising:
a first housing associated with the auger; and
a second housing associated with the stabilizer, wherein the actuator moves the first housing with respect to the second housing.

8. The skid steer trimmer assembly of claim 7, further comprising:
a second actuator, wherein the second actuator vertically adjusts a first end of the auger and the actuator vertically adjust a second end of the auger.

9. The skid steer trimmer assembly of claim 1, wherein the auger is supported by a first frame,
the stabilizer supports a second frame,
the first frame is movably supported by the second frame, the actuator is connected to the first frame and the second frame and vertically moves at least a portion of the auger with respect to the stabilizer.

10. A skid steer trimmer assembly comprising:
an auger supported by a first housing;
a motor configured to actuate the auger;
a first actuator configured to adjust a first end of the first housing;
a second actuator configured to adjust a second end of the first housing;
a stabilizer behind the auger;
a second housing supported by the stabilizer; and
a coupler arranged behind the stabilizer, the coupler configured to couple the skid steer trimmer assembly to a skid steer.

11. The skid steer trimmer assembly of claim 10, wherein the auger forms an angle of about 75 to about 85 degrees with a direction of travel of the skid steer trimmer assembly.

12. The skid steer trimmer assembly of claim 10, further comprising:
a hydraulic circuit configured to control hydraulic fluid flowing to the motor and the first and second actuators.

13. The skid steer trimmer assembly of claim 12, further comprising:
an electronic controller configured to control the hydraulic circuit.

14. The skid steer trimmer assembly of claim 13, wherein the electronic controller controls the first and second actuators in accordance with an electronic surface stored in a memory of the electronic controller.

15. The skid steer trimmer assembly of claim 10, wherein the stabilizer is at least one of a roller, a wheel, and a skid.

16. The skid steer trimmer assembly of claim 10, wherein the first and second actuators move ends of the auger vertically with respect to the stabilizer.

17. The skid steer trimmer assembly of claim 10, wherein a first end of the first actuator is connected to the first housing, a first end of the second actuator is connected to the first housing, a second end of the first actuator is connected to the second housing, and a second end of the second actuator is connected to the second housing.

18. The skid steer trimmer assembly of claim 10, wherein the auger has flightings configured to move soil generally perpendicular to a direction of travel of the skid steer trimmer assembly.

19. The skid steer trimmer assembly of claim 10, further comprising:
a controller configured to control the first and second actuators to control an orientation and elevation of the auger.

* * * * *